US010205751B2

(12) United States Patent
Esary et al.

(10) Patent No.: US 10,205,751 B2
(45) Date of Patent: *Feb. 12, 2019

(54) SYSTEM, METHOD AND COMPUTER PROGRAM PRODUCT FOR SHARING CONTENT VIA LINKS

(71) Applicant: salesforce.com, inc., San Francisco, CA (US)

(72) Inventors: Niel Crawford Esary, Mountain View, CA (US); Durgesh Singh, Sunnyvale, CA (US); Miko A. Bose, San Francisco, CA (US); Robert J. Snell, Edgware (GB); Valliappan Annamalai Natarajan, San Ramon, CA (US); Matthew Hagenian, San Francisco, CA (US); Bruno Darrigrand, Le Pecq (FR)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/657,974

(22) Filed: Jul. 24, 2017

(65) Prior Publication Data
US 2018/0013794 A1 Jan. 11, 2018

Related U.S. Application Data

(63) Continuation of application No. 14/578,260, filed on Dec. 19, 2014, now Pat. No. 9,716,730.
(Continued)

(51) Int. Cl.
H04L 29/06 (2006.01)
H04L 29/08 (2006.01)
G06F 17/30 (2006.01)

(52) U.S. Cl.
CPC ........ *H04L 63/20* (2013.01); *G06F 17/30873* (2013.01); *G06F 17/30899* (2013.01);
(Continued)

(58) Field of Classification Search
CPC ....... H04L 63/20; H04L 63/123; H04L 63/10; H04L 67/2804; H04L 67/02;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Office Action in U.S. Appl. No. 14/578,260 dated Sep. 21, 2016, 12 pages.

*Primary Examiner* — Thanhnga B Truong
(74) *Attorney, Agent, or Firm* — Meyertons, Hood, Kivlin, Kowert & Goetzel, P.C.

(57) ABSTRACT

In accordance with embodiments, there are provided mechanisms and methods for sharing content via links. These mechanisms and methods for sharing content via links can enable customizable features associated with the operations related to those links. These features may include generating customized reports on usage of the links, and/or exposing one or more application programming interfaces (APIs) enabling applications to access the links and/or logic associated with operations related to those links.

20 Claims, 6 Drawing Sheets

Related U.S. Application Data

(60) Provisional application No. 62/062,759, filed on Oct. 10, 2014.

(52) U.S. Cl.
CPC ............ *H04L 63/10* (2013.01); *H04L 63/123* (2013.01); *H04L 67/02* (2013.01); *H04L 67/1097* (2013.01); *H04L 67/2804* (2013.01)

(58) Field of Classification Search
CPC ..... H04L 67/1097; G06F 15/16; G06F 9/445; G06F 17/30; G06F 17/30899; G06F 17/30873
USPC ................. 709/726, 205, 217, 219; 726/1, 9
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,039 B2 | 8/2010 | Weissman et al. |
| 7,877,451 B2 * | 1/2011 | Portilla ................ G06Q 10/107 709/205 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,478,782 B1 * | 7/2013 | Kuruganti ......... G06F 17/30575 707/713 |
| 8,484,111 B2 | 7/2013 | Frankland et al. |
| 9,201,668 B2 * | 12/2015 | Beckert ................. G06F 9/445 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0123152 A1 * | 6/2004 | Le Saint ................. G06F 21/52 726/9 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |

(56) References Cited

U.S. PATENT DOCUMENTS

| | | |
|---|---|---|
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0223467 A1 | 9/2010 | Dismore et al. |
| 2013/0218948 A1 | 8/2013 | Jakobson |
| 2013/0218949 A1 | 8/2013 | Jakobson |
| 2013/0218966 A1 | 8/2013 | Jakobson |

\* cited by examiner

SYSTEM, METHOD AND COMPUTER PROGRAM PRODUCT FOR SHARING CONTENT VIA LINKS

CLAIM OF PRIORITY

The present application is a continuation of U.S. application Ser. No. 14/578,260, filed Dec. 19, 2014 (now U.S. Pat. No. 9,716,730), which claims priority to U.S. Provisional Appl. No. 62/062,759, filed Oct. 10, 2014; the disclosures of each of the above-referenced applications are incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to making content accessible in a content delivery system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional content delivery systems, content is stored either locally or remotely, but in either case is shared by being delivered upon request through the content delivery system. Typically, the content delivery system includes hardware and software for processing the requests for content, and is further connected to a network for communicating the content to the requesting entity. This content may be web pages, images, documents, database records, etc.

The content requests can take many different forms, and may be initiated in a variety of ways. One approach to enabling access to content through a content delivery system has been to create a link that references stored content and then make that stored content available to entities via the link. Besides some content delivery systems allowing links themselves to be customized (e.g. custom character sequence, etc.), content delivery systems generally have not enabled any further customizable features in regards to the operations related to these links.

There is thus a need for addressing those and/or other issues associated with the prior art.

BRIEF SUMMARY

In accordance with embodiments, there are provided mechanisms and methods for sharing content via links. These mechanisms and methods for sharing content via links can enable customizable features associated with the operations related to those links. These features may include generating customized reports on usage of the links, and/or exposing one or more application programming interfaces (APIs) enabling applications to access the links and/or logic associated with operations related to those links.

In one embodiment, logic is stored in memory of a content delivery system, where the logic is for creating a link to content, for storing, by the content delivery system, a content delivery object having at least an identification of the link and an identification of the content, and further for allowing end users to use the link to access the content, via the content delivery object. An application programming interface to the logic and to each content delivery object is also stored by the content delivery system. Further, the application programming interface is exposed to applications separate from the content delivery system. This exposing includes receiving, from the applications, calls to the exposed application programming interface for at least one of invoking the logic and accessing one or more of the content delivery objects stored by the content delivery system, includes executing, by a processor of the content delivery system, the logic in response to receiving, from the applications, calls to the exposed application programming interface to invoke the logic, and includes performing, by the processor of the content delivery system, an operation on the one or more of the content delivery objects stored by the content delivery system in response to receiving, from the applications, calls to the exposed application programming interface to access the one or more of the content delivery objects stored by the content delivery system.

In another embodiment, a plurality of content delivery objects each having at least an identification of content and an identification of a link to the content are stored in memory of a content delivery system. For each of the content delivery objects, access rights to permit end users to use the link to access the content are provided via the content delivery object. Additionally, information is provided from the content delivery system to generate a user interface providing for user input regarding parameters for reporting on the stored content delivery objects of the content delivery system. Parameters for reporting on the stored content delivery objects provided through the user input are received at the content delivery system. Further, a query is generated by the content delivery system using the received parameters, the query being for a subset of the content delivery objects stored in the memory that meet the parameters. The query is executed by the content delivery system, and a customized report regarding the stored content delivery objects which includes results of the query indicating the subset of the content delivery objects stored in the memory that meet the parameters is generated by the content delivery system.

While one or more implementations and techniques are described with reference to an embodiment in which sharing content via links is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for exposing an application programming interface (API) enabling access to logic and data associated with sharing content via links, and further for generating a customized report regarding content delivery objects utilized for sharing content via links.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Figure 1:
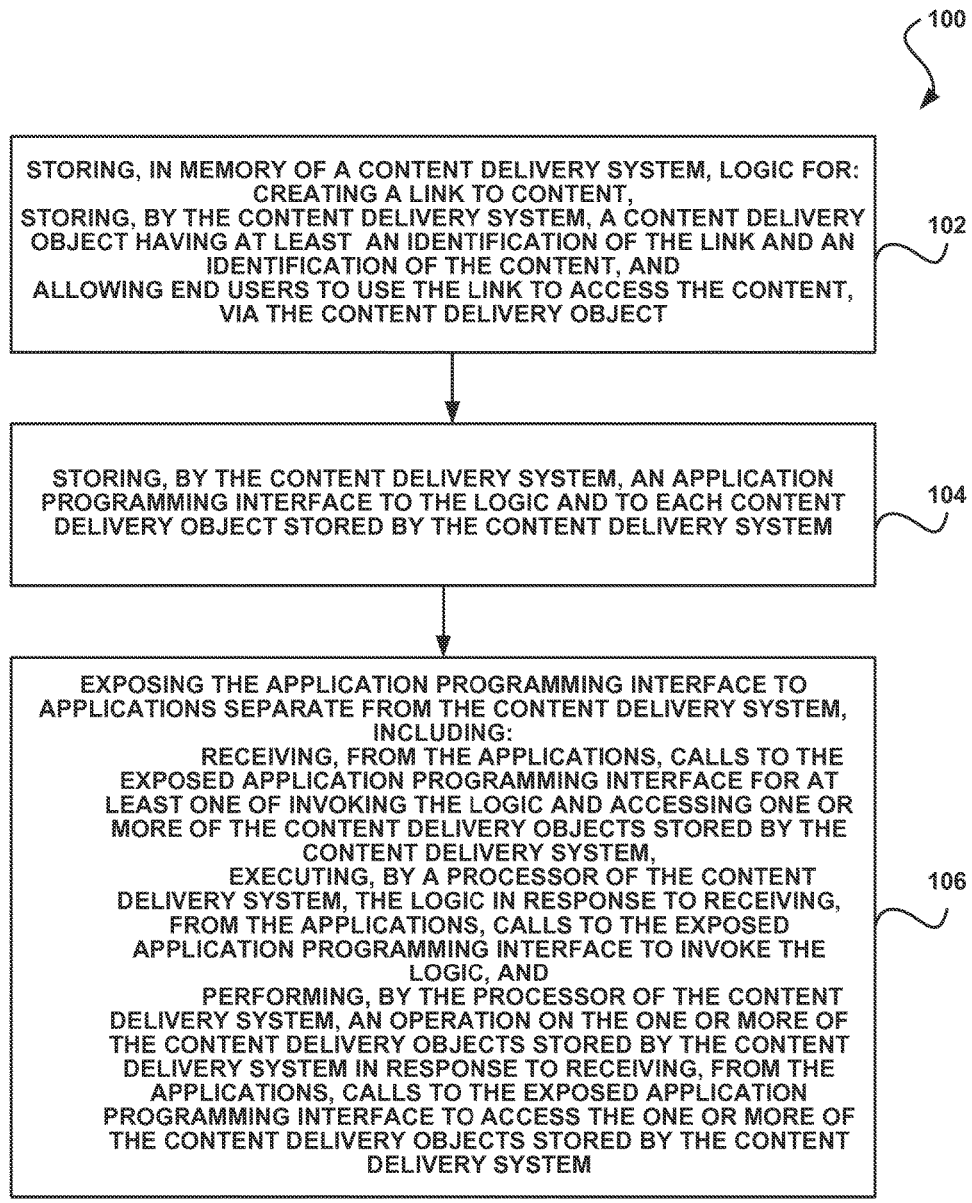
FIG. 1 illustrates a method for exposing an application programming interface (API) enabling access to logic and data associated with sharing content via links, in accordance with an embodiment.

FIG. 1 illustrates a method 100 for exposing an application programming interface (API) enabling access to logic and data associated with sharing content via links, in accordance with an embodiment. As shown in operation 102, logic is stored in memory of a content delivery system, where the logic is for creating a link to content, for storing, by the content delivery system, a content delivery object having at least an identification of the link and an identification of the content, and further for allowing end users to use the link to access the content, via the content delivery object.

In one embodiment, the content delivery system may be sub-system of the system described below with respect to FIGS. 5-6. For example, the content delivery system may include servers and/or other computing systems, including a database system, that are components of a multi-tenant on-demand database system. Of course, however, the content delivery system may not necessarily be implemented in the context of the system described below with respect to FIGS. 5-6, but may be any system that includes servers and/or other computing systems for sharing content via links.

As noted above, memory of the content delivery system stores logic for sharing content via links. The logic is specifically for creating a link to content, in one aspect. The content may be stored locally to, or remotely from, the content delivery system, and may include a web page, a document, an image, etc. Further, the link may be any information usable by a user to access (e.g. retrieve, view, etc.) the content. For example, the link may be a uniform resource locator (URL) or another type of indicator of a location at which the content is stored. In an embodiment, the logic may create the link to the content upon request. Thus, the link may be created on-demand. As a further option, where the content is non-web based, the logic may convert the content to a web-based version where the link is usable for accessing the web-based version of the content.

The logic is also specifically for storing, by the content delivery system, a content delivery object having at least an identification of the link and an identification of the content. The content delivery object may be a record of a database table of the content delivery system, in one embodiment, but of course in other embodiments may be other types of data object storing the identification of the link and the identification of the content. As an option, the content delivery object may have the identification of the link by storing the link itself in a portion (e.g. field, etc.) of the content delivery object. As another option, the content delivery object may have the identification of the link by storing, in a portion of the content delivery object, a reference to the link, which may be stored elsewhere by the content delivery system. Similarly, the content delivery object may have the identification of the content by storing a reference to the content, or by storing the content itself, in a portion of the content delivery object. Optionally, the content delivery object may store metadata describing the content delivery object (see Table 2 below) and/or may store configuration settings (see Table 1 below).

The logic is further specifically for allowing end users to use the link to access the content, via the content delivery object. This may include an end user submitting the link to the content delivery system (e.g. via a browser, etc.), the content delivery system using the content delivery object having the identification of the link to determine the associated identification of the content included in that content delivery object, and then using the identification of the content to retrieve the content and send the content to the end user. To this end, the end user may be notified of the link, once created, for subsequently using the link to the access the content. Such notification may be made via email or in other desired way by a user or application that requested the creation of the link. Further, the notification may be made through the content delivery system, or as another option the user that requested the creation of the link may be notified of the link through the content delivery system and may then notify the end user through a communication channel that is independent of the content delivery system.

While various functions of the logic have been described above, it should be noted that the logic may also include other functions as desired. These functions may include editing and/or deleting content delivery objects. As another option, the functions may include configuring settings of the content delivery objects. In one embodiment, multiple links to the same content may be created and stored in separate content delivery objects, via the logic. Further to this embodiment, each of the separate content delivery objects may have different configuration settings, as desired (e.g. based on the intended recipients of the link, etc.).

Table 1 below illustrates various settings and other metadata that may be included in the content delivery object. While Table 1 illustrates the settings being stored in fields of the content delivery object, it should be noted that the settings may be stored in any type of portion of the content delivery object that is in accordance with a format of the content delivery object. Further, while Table 1 references the content as files and the link as a URL, it should be noted that the present description is not necessarily limited by these examples.

TABLE 1

| Field | Description |
| --- | --- |
| Allow Recipient to View in the Browser | If checked, the content can be viewed online in a custom Web page. On the content delivery object details page, this field is labeled Allow View in the Browser. |
| Allow Recipient to Download as PDF | If checked, converts content including Microsoft ® Word, Excel, and/or PowerPoint files into PDF files and gives the recipient the option of downloading the PDF. If the content is not originally a PDF, Word, Excel, or PowerPoint file, this option does not appear in the create-content delivery object wizard. On the content delivery object details page, this field is labeled Allow Download as PDF. |
| Allow Download in Original Format | If checked, the content delivery object allows recipients to download the original file. In the create-content delivery object wizard, this field is called Allow Recipient to Download as [file type] where [file type] is the original file's file type, such as .ppt, .pdf, or .doc. |
| Author | The user who published the file. (Read only) |
| Content Delivery Name | The name assigned to the content delivery object. By default, the Content Delivery Name includes the file name and the creation date. |
| Content Delivery Opens Latest Version | This flag indicates that the recipient of a link sees the most current version of the associated file. For example, if a file is updated between the content delivery object creation date and the current date, a recipient who views the content delivery object sees the newest version. |
| Content Delivery Expires | A flag that indicates whether access to the content delivery object will expire on the expiration date. In the create-content delivery object wizard, this flag corresponds to the checkbox next to the Remove access to content on field. |
| Created By | The user who created the content delivery object, including creation date and time. (Read only) |
| Description | The description provided when the file was published. (Read only) |
| Expiration Date | The date on which the content can no longer be viewed via the content delivery object. In the create-content delivery object wizard, this is the date entered in the Remove Access to Content on field. |
| File Downloaded | A flag that indicates whether a file in the content delivery object was downloaded. For example, if a content delivery object includes options to view the content in the browser, download the content in its original file format, and download the content as a PDF file, this flag is checked if the recipient downloads the original file or the PDF file. (Read only) |
| Internal View | A flag that indicates whether a user with an account to the content delivery system viewed the content. A view is considered internal if the user opens the URL in the content delivery object from within content delivery system, for example by clicking View on the Content Deliveries related list or clicking the URL on the delivery detail page. If the user copies the URL and pastes it into his or her browser, the view is considered external. (Read only) |
| Last Modified By | The user who last modified the content, including modification date and time. (Read only) |
| Last Viewed | The date and time on which the content was last viewed. A view is one click of the URL in the content delivery object. (Read only) |
| Notify Me of First View or Download | If checked, the user who created the content delivery object receives an email notification the first time the URL in the content delivery object is clicked. |
| Owner Name | The user who owns the content delivery object. (Read only) |
| Related To | The record that the in the content delivery object is associated with, such as an account, opportunity, or custom object. Users with sharing access to the record can click it to view more details. |
| Require Password to Access Content | If checked, the recipient must enter the provided password before viewing the content via the content delivery object. The password appears when the content delivery object is generated and for the life of the content delivery object on the delivery detail page. |
| Title | The title of the file included in the content delivery object. (Read only) |
| View Count | Total number of views for the content via the content delivery object, including internal and external. (Read only) |

More information regarding one exemplary implementation of the aforementioned logic by Salesforce.com, Inc.™ is described in U.S. patent application Ser. No. 12/693,258, filed Jan. 25, 2010, by Dismore et al. and entitled "Methods and Systems for Sharing Database Content," which is incorporated herein by reference in its entirety.

As shown in operation 104, an application programming interface (API) to the logic and to each content delivery object is also stored by the content delivery system. The API may be any interface to the logic and to each content delivery object created via the logic. In particular, the logic and content delivery objects (including configuring settings of the content delivery objects) may be made accessible via the API. While only one API is described herein, it should be noted that in another embodiment multiple APIs to various portions of the logic and/or to the created content delivery objects may also be stored by the content delivery system. In the exemplary implementation by Salesforce.com, Inc.™ mentioned above, the API may be the SObject API.

Further, as shown in operation 106, the API is exposed to applications separate from the content delivery system. The applications may be developed by third parties to the content delivery system, and may be run on systems separate from the content delivery system. For example, in an embodiment where the content delivery system is a sub-system of the system described below with respect to FIGS. 5-6, the applications may be developed by customers of the system described below with respect to FIGS. 5-6.

However, by exposing the API to the applications, the applications may be capable of accessing the logic and the content delivery objects stored by the content delivery system. This exposing may include making the API publicly accessible, such that the applications can make calls into, and receive responses from, the API. As an option, the API may enforce security policies of the content delivery system in regards to permitting the applications to access the logic and the content delivery objects through the API. These security policies may be evaluated in terms of permissions for the applications themselves and/or permissions for users of the applications. The security policies may control which portions of the logic and/or which of the content delivery objects are accessible through the application (e.g. to a user thereof). Further, in regards to accessing the content delivery objects, the security policies may include those configured for the individual content delivery objects (e.g. password requirements, etc.).

Specifically, exposing the API includes, in one aspect, receiving, from the applications, calls to the exposed API for invoking the logic and/or accessing one or more of the content delivery objects stored by the content delivery system. In another aspect, in response to receiving from the applications calls to the exposed API to invoke the logic, a processor of the content delivery system invokes the logic. A call to the exposed API for invoking the logic may include any call to invoke one or more functions of the logic. For example, the call may be to create a link to content, to store the link in a content delivery object, to configure settings and/or metadata for the content delivery object, to edit a configuration of an existing content delivery object, to delete an existing content delivery object, etc. By invoking the logic, the content delivery system may perform the functions associated therewith.

In a further aspect, in response to receiving from the applications calls to the exposed API to access the content delivery objects stored by the content delivery system, the processor of the content delivery system performs an operation on the content delivery objects stored by the content delivery system. The access may be to retrieve a subset of the content delivery objects for viewing a representation of (e.g. a settings configuration of, metadata of, etc.) the same. For example, an application may issue a call to the exposed API to query the content delivery objects for a subset thereof that meet specified criteria. The processor of the content delivery system may then perform the query and return to the API a subset of the content delivery objects resulting from the query such that the API may forward the same (e.g. including a representation of such content delivery objects) to the application. The specified criteria may be values for any of the configuration settings of the content delivery objects, an association with particular content, values for metadata of the content delivery objects, etc.

By exposing the API to the logic and the content delivery objects stored by the content delivery system, the logic and content delivery objects may be accessed by applications outside of the content delivery system. This may allow third parties to the content delivery system to build applications on top of the existing logic and content delivery objects stored by the content delivery system. These applications may optionally be created for automated invocation of the logic in accordance with preconfigured triggers/criteria and/or for automated access to the content delivery objects in accordance with preconfigured triggers/criteria.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
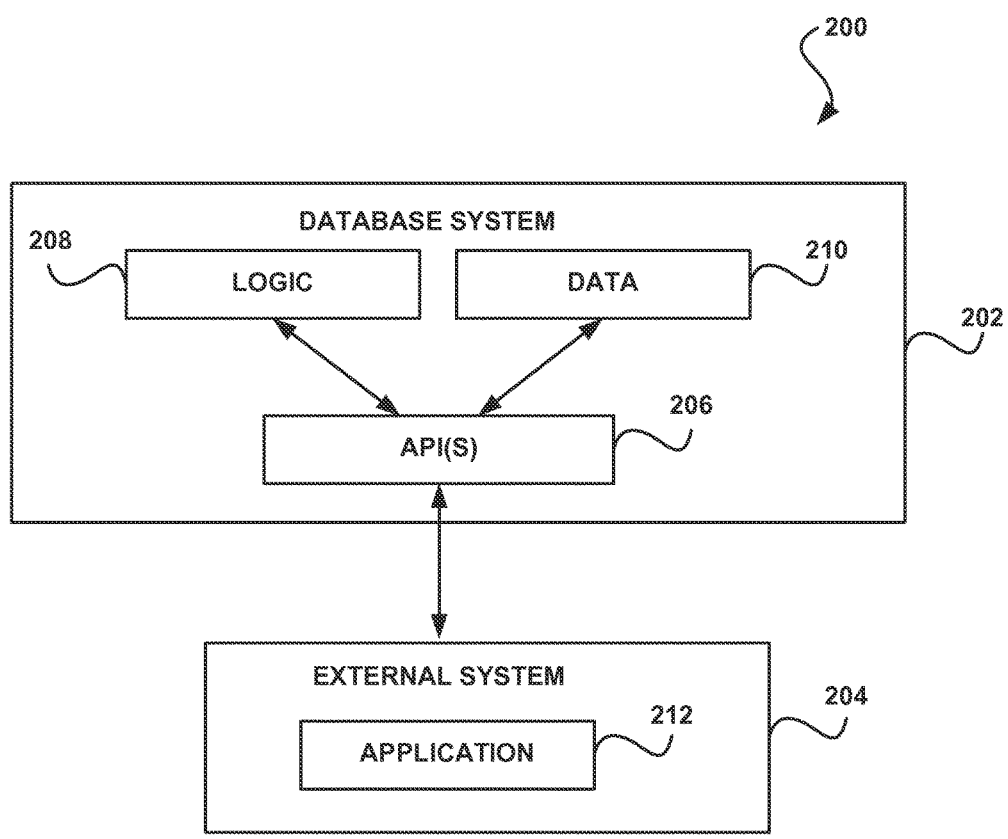
FIG. 2 illustrates a system including a database system exposing an API enabling access to logic and data associated with sharing content via links, in accordance with an embodiment.

FIG. 2 illustrates a system 200 including a database system 202 exposing an API 206 enabling access to logic 208 and data 210 associated with sharing content via links, in accordance with an embodiment. As an option, the database system 202 of the present system 200 may be implemented to carry out the method 100 of FIG. 1. Of course, however, the database system 202 may be implemented in any desired environment. It should also be noted that the aforementioned definitions may apply during the present description.

As shown, the database system 202 includes logic 208 and data 210. In the present embodiment, the logic 208 is for sharing content via links, such as the logic described above with respect to FIG. 1. Also in the present embodiment, the data 210 is that which is created by the logic 208 (i.e. content delivery objects). The data 210 may also include the content that is shared via the links, but in another embodiment the content may be stored externally to the database system 202. In any case, the logic 208 and data 210 may be stored in memory of the database system 202.

The database system 202 also includes one or more APIs 206 enabling access to the logic 208 and data 210 by an application 212 of an external system 204. The external system 204 may be a server or other computer system that is external to the database system 202 (e.g. that is hosted separately from the database system 202). To this end, the application 212 is run by the external system 204, and thus separately from the database system 202. It should be noted that while only one application 212 and associated external system 204 are shown, the system 200 may include any number of different applications running on any number of different external systems, each of which access the logic 208 and data 210 and of the database system 202 through the API(s) 206 of the database system 202.

The external system 204 and the database system 202 may be connected with one another via a network (e.g. the Internet), as an option. This may include the application 212 of the external system 204 and the API 206 of the database system 202 communicating over the network, examples of which are described in more detail below.

In an embodiment, the application 212 communicates a call to the API 206 for invoking the logic 208. Just by way of example, the call may be an instruction to perform particular functions within the logic 208, such as creating a link to content. In this case, the call may be to invoke the portion of the logic 208 specific to creating links to content and storing the same in a content delivery object which is then stored in the data 210 of the database system 202.

The API 206 invokes the logic 208 in accordance with the received call, and a processor of the database system 202 processes the logic 208 accordingly. The API 206 then receives any output resulting from the processing of the logic 208, and communicates the output to the application 212 of the external system 204. In the example of creating the link to the content, the API 206 may receive the link from the logic 208 and may forward that link to the application 212 of the external system 204.

In another embodiment, the application 212 communicates a call to the API 206 for accessing one or more of the content delivery objects stored in the data 210 of the database system 202. Just by way of example, the call may be a query for one or more of the content delivery objects. The API 206 invokes a processor to perform an operation on the content delivery objects for making the access instructed by the call, and receives any output resulting from the access. The API 206 then communicates the output to the application 212 of the external system 204. In the example of querying for one or more of the content delivery objects, the API 206 may invoke the processor to query the data 210 for content delivery objects stored therein that meet parameters of the query, and may communicate any content delivery objects returned from the query to the application 212.

The API(s) 206 may map field labels of portions (e.g. fields) of the content delivery objects storing configuration settings, metadata, identification of a link, identification of content, etc. to field names that are addressable by the application 212 of the external system 204. Thus, when the APT 206 receives a call from the application 212 addressing a particular field name (e.g. for configuring or accessing a value of the associated field in the content delivery object), the API 206 may identify the associated field label using the mapping and may invoke the logic or operation in regards to that field label.

Table 2 illustrates an exemplary mapping of field labels to field names that may be provided by the API 206. Of course, the mapping shown in Table 2 is set forth for illustrative purposes only and should not be construed as limiting in any manner.

TABLE 2

| Content Delivery Object Field Label | API Field Name | Description |
| --- | --- | --- |
| Content Delivery ID | Id | Unique identifier of content delivery object |
| Created Date | CreatedDate | Creation date of content delivery object |
| Created By ID | CreatedById | Identifier of User/application that created content delivery object |
| Owner ID | OwnerId | Identifier of owner of content delivery object |
| Last Modified Date | LastModifiedDate | Date of last modification to content delivery object |
| Last Modified By I | LastModifiedById | Identifier of user/application that last modified content delivery object |
| System Modstamp | SystemModstamp | |
| Content Delivery Name | Name | Name configured for content delivery object |
| Deleted | IsDeleted | Flag indicating content delivery object has been deleted |
| ContentVersion ID | ContentVersionId | Identifier of latest version of content |
| ContentDocument ID | ContentDocumentId | Identifier of content |
| Related Record ID | RelatedRecordId | Identifier of records related to the content delivery object (e.g. Account, Case, Campaign, Contact, Lead, Opportunity, Custom Object) |

TABLE 2-continued

| Content Delivery Object Field Label | API Field Name | Description |
|---|---|---|
| Allow Download as PDF | PreferencesAllowPDFDownload | Flag indicating configuration to allow download of content as a PDF |
| Allow Download in Original Format | PreferencesAllowOriginalDownload | Flag indicating configuration to allow download of original content |
| Require Password to Access Content | PreferencesPasswordRequired | Flag indicating configuration that password is required to access content |
| Notify Me of First View or Download | PreferencesNotifyOnVisit | Flag indicating configuration to notify the owner of the content delivery object of the first view/download of the content made via the content delivery object |
| Content Delivery Opens Latest Version | PreferencesLinkLatestVersion | Flag indicating configuration to open a latest version of the content when content is accessed via the content delivery object |
| Allow View in the Browser | PreferencesAllowViewInBrowser | Flag indicating configuration to allow content to viewed in browser via the content delivery object |
| Content Delivery Expires | PreferencesExpires | Flag indicating configuration to expire content delivery object |
| Email when Preview Images are Ready | PreferencesNotifyRndtnComplete | |
| Expiration Date | ExpiryDate | Expiration date of content delivery object |
| Password | Password | Password for accessing content via content delivery object |
| View Count | ViewCount | Count of number of views of content via content delivery object |
| First Viewed | FirstViewDate | Date of first view of content via content delivery object |
| Last Viewed | LastViewDate | Date of last view of content via content delivery object |
| External Link | DistributionPublicUrl | Identification of link to content |

Table 3 illustrates an exemplary query for content delivery objects (shown as ContentDocument) that may be made by an application 212 to the API 206.

TABLE 3

```
Select id, title,
    (select Id, Name, ContentVersionId, ContentDocumentId,
    RelatedRecordId, DistributionPublicUrl from ContentDistributions)
    from ContentDocument
    where <criterion...>
```

Figure 3:
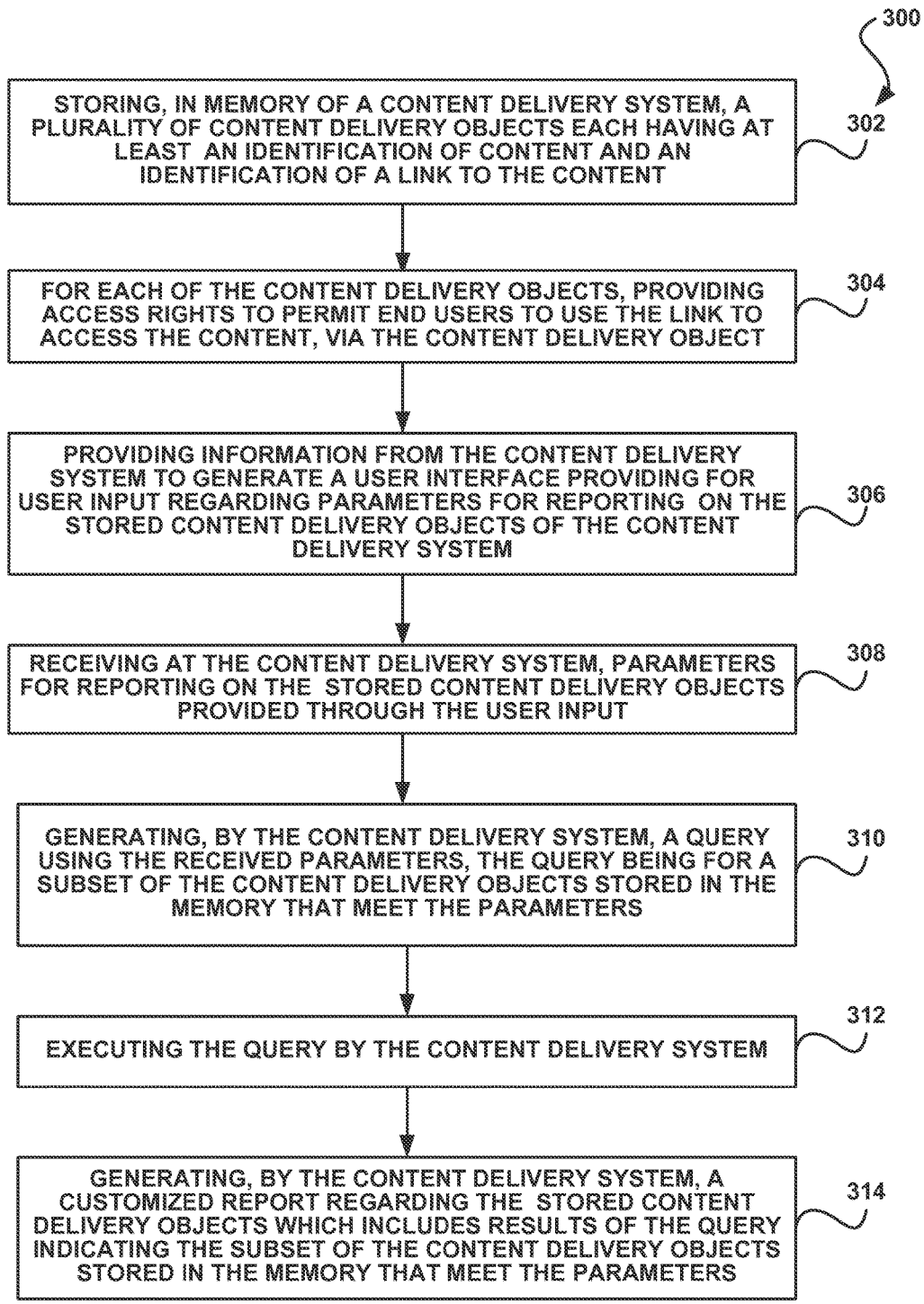
FIG. 3 illustrates a method for generating a customized report regarding content delivery objects utilized for sharing content via links, in accordance with an embodiment.

FIG. 3 illustrates a method 300 for generating a customized report regarding content delivery objects utilized for sharing content via links, in accordance with an embodiment. Again, it should be noted that the aforementioned definitions may apply during the present description.

As shown in operation 302, a plurality of content delivery objects each having at least an identification of content and an identification of a link to the content are stored in memory of a content delivery system. The content delivery objects may be generated by the content delivery system upon request from a user utilizing an interface of the content delivery system, in one embodiment. In another embodiment, the content delivery objects may be generated by the content delivery system upon request from an external application utilizing an API of the content delivery system (e.g. as described above with reference to FIGS. 1 and/or 2).

As shown in operation 304, for each of the content delivery objects, access rights to permit end users to use the link to access the content are provided via the content delivery object. For example, any user with knowledge of a link identified in one of the content delivery objects may be permitted access to the content identified by that same content delivery object upon submission of the link to the content delivery system (e.g. through a browser in communication with the content delivery system). Optionally, the content delivery object may be configured to require a password for permitting access to the content, in which case any user with knowledge of the link identified by the content delivery object and with knowledge of the password identified by the content delivery object may be permitted access to the content identified by that same content delivery object upon submission of the link to the content delivery system (e.g. through the aforementioned browser) and further upon submission of the password to the content delivery system (e.g. through an interface of the content delivery system provided through the browser). Of course, the content delivery object may be configured with other security measures, as desired, which may be enforced by the content delivery system.

Additionally, as shown in operation 306, information is provided from the content delivery system to generate a user interface providing for user input regarding parameters for reporting on the stored content delivery objects of the content delivery system. In other words, the content delivery system provides the user interface to a user (e.g. via a browser of a device of the user) through which the user is capable of providing input including parameters for reporting on the stored content delivery objects of the content delivery system. In this way, the user interface may be specific to configuring a report regarding the stored content delivery objects of the content delivery system.

In one embodiment, the parameters may be specific to the content identified by, and made accessible using, the content delivery objects. For example, the parameters may indicate one or more characteristics of the content (e.g. a name of the content, a unique identifier for the content, etc.). In another embodiment, the parameters may be specific to the links identified by the content delivery objects, such as a creation date of the links. In yet another embodiment, the parameters may be specific to configuration settings and/or other metadata stored by the content delivery objects. Thus, in this embodiment the parameters may be values for any of the information stored in the content delivery objects (e.g. see Table 1 above).

As shown in operation 308, parameters for reporting on the stored content delivery objects provided through the user input are received at the content delivery system. For example, when the user accesses the user interface to configure a report regarding the stored content delivery objects of the content delivery system, the user may input parameters for the report and those parameters may then be received at the content delivery system. The parameters may indicate filtering criteria to be used for selecting which of the content delivery objects stored in the content delivery system are to be included in the report, in one embodiment.

Further, as shown in operation 310, a query is generated by the content delivery system using the received parameters, the query being for a subset of the content delivery objects stored in the memory that meet the parameters. In other words, the query may be capable of searching for the subset of the content delivery objects stored in the memory that meet the parameters input by the user. As noted above, the parameters may include filtering criteria to be used for selecting which of the content delivery objects stored in the content delivery system are to be included in the report. Accordingly, the query may be generated to select from the memory of the content delivery system the content delivery objects stored therein that meet the parameters input by the user.

As an option, the query may be optimized according to one or more preconfigured policies of the content delivery system. In one embodiment, the query may be optimized for efficient searching. In another embodiment, the query may be optimized for enforcing the security policies of the content delivery system.

As shown in operation 312, the query is executed by the content delivery system, and a customized report regarding the stored content delivery objects which includes results of the query indicating the subset of the content delivery objects stored in the memory that meet the parameters is generated by the content delivery system. It should be noted that a processor of the content delivery system may execute the query described above against the memory storing the content delivery objects.

As described above, executing the query may include selecting from the memory of the content delivery system the content delivery objects stored therein that meet the parameters input by the user. For example, the parameters input by the user may be compared to metadata of the content delivery objects for determining the subset of the content delivery objects that meet the parameters input by the user.

As an option, the input received at the content delivery system from the user may indicate presentation criteria to be used for displaying the selected content delivery objects within the report. The presentation criteria may indicate an ordering by which the selected content delivery objects are to be displayed within the report. The presentation criteria may also indicate which portions (e.g. fields) of the selected content delivery objects are to be displayed in the report. As a further option, executing the query may also include ordering the content delivery objects selected via the query in accordance with the presentation criteria. Of course, the ordering may also be performed separately from the query for the subset of the content delivery objects. Where no presentation criterion is specified by the user, default presentation criteria may be used.

The aforementioned customized report is then generated by the content delivery system, using the results of the query. Thus, the selected, and optionally ordered, content delivery objects may be added to the report. In one embodiment, the report may be generated from a predefined template, and then customized by inserting the results of the query. Further, formatting of the report may be customized based on the parameters forming the basis for the query, and optionally any presentation criteria input by the user. While not shown, it should be noted that the customized report is further provided to the user by the content delivery system (e.g. through the user's browser).

To this end, a user may configure parameters to be used for reporting on content delivery objects stored by the content delivery system. These parameters may be configured through a user interface of the content delivery system, as described above, and may specify values for any metadata stored by the content delivery objects. This may allow users, for example, to view a desired subset of content delivery objects stored by the content delivery system, and to view that subset in a customized format (e.g. with a customized ordering, including a customization of which portions of the subset are displayed, etc.).

Figure 4:
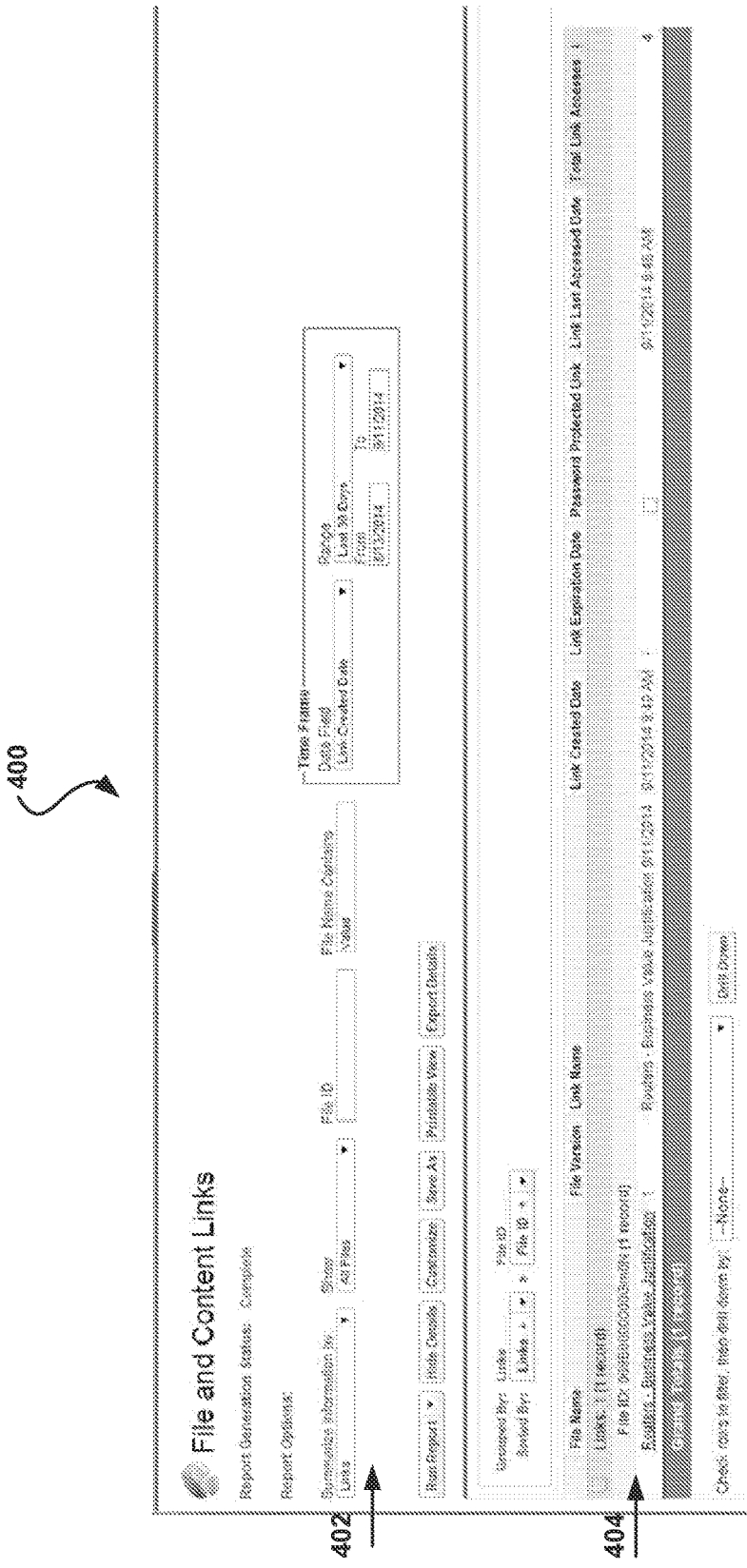
FIG. 4 illustrates an exemplary user interface for generating a customized report regarding content delivery objects utilized for sharing content via links, in accordance with an embodiment.

FIG. 4 illustrates an exemplary user interface 400 for generating a customized report regarding content delivery objects utilized for sharing content via links, in accordance with an embodiment. As an option, the user interface 400 may be implemented in the context of the user interface described above with reference to FIG. 3. Of course, however, the user interface 400 may be implemented in any desired environment. Yet again, it should be noted that the aforementioned definitions may apply during the present description.

As shown, the user interface 400 is specific to reporting on content delivery objects that allow content to be shared via links (see "File and Content Links"). The user interface 400 includes a plurality of report options 402 allowing a user to input parameters for reporting on stored content delivery objects of a content delivery system. The report options 402 are provided as drop down lists and text boxes, but of course in other embodiments could be any type of input fields.

In the embodiment shown, the report options 402 include a first parameter by which selected content delivery objects are ordered. The report options 402 also include a second parameter indicating a category of content to be used as filtering criteria for the content delivery objects to be reported (see "Show: All Files"). The report options 402 further include characteristics of the content that are to be used as filtering criteria for the content delivery objects to be reported (see "File ID" and "File Name Contains"). Still yet, the report options 402 include a time period to be used as filtering criteria for the content delivery objects to be reported (see "Date Field" and "Range").

The user interface 400 also includes buttons related to generating the report, such as a button to generate the report (see "Run Report"), a button to save the configured parameters to be used for generating the report (see "Save As"), etc. Still yet, the user interface 400 includes display options for the customized report (see "Sorted By").

The user interface 400 further includes the customized report 404. Thus, in the present embodiment, the customized report 404 may be displayed simultaneously with the report options 402. In this way, the user may view the parameters used to generate the report in conjunction with the report, and may modify those parameters as desired for generating a new report.

System Overview

Figure 5:
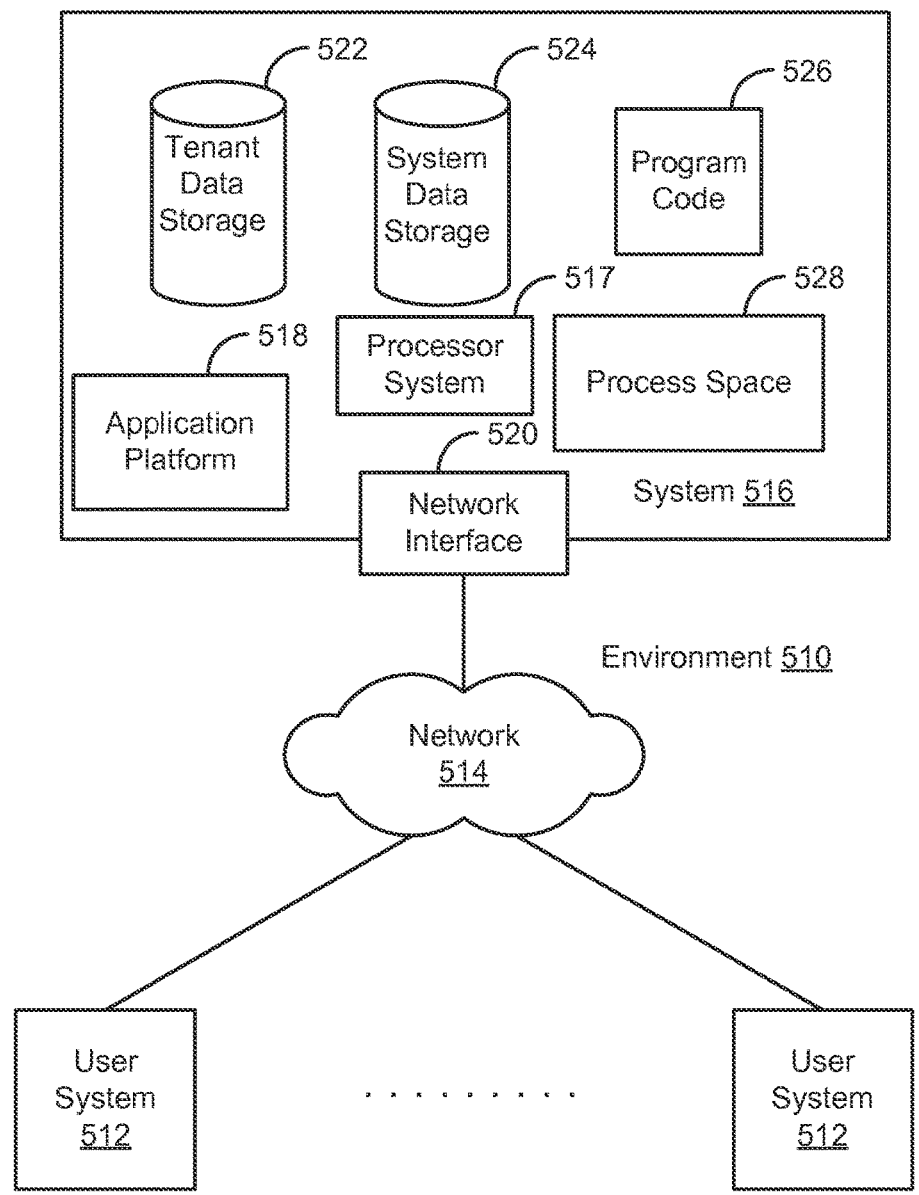
FIG. 5 illustrates a block diagram of an example of an environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
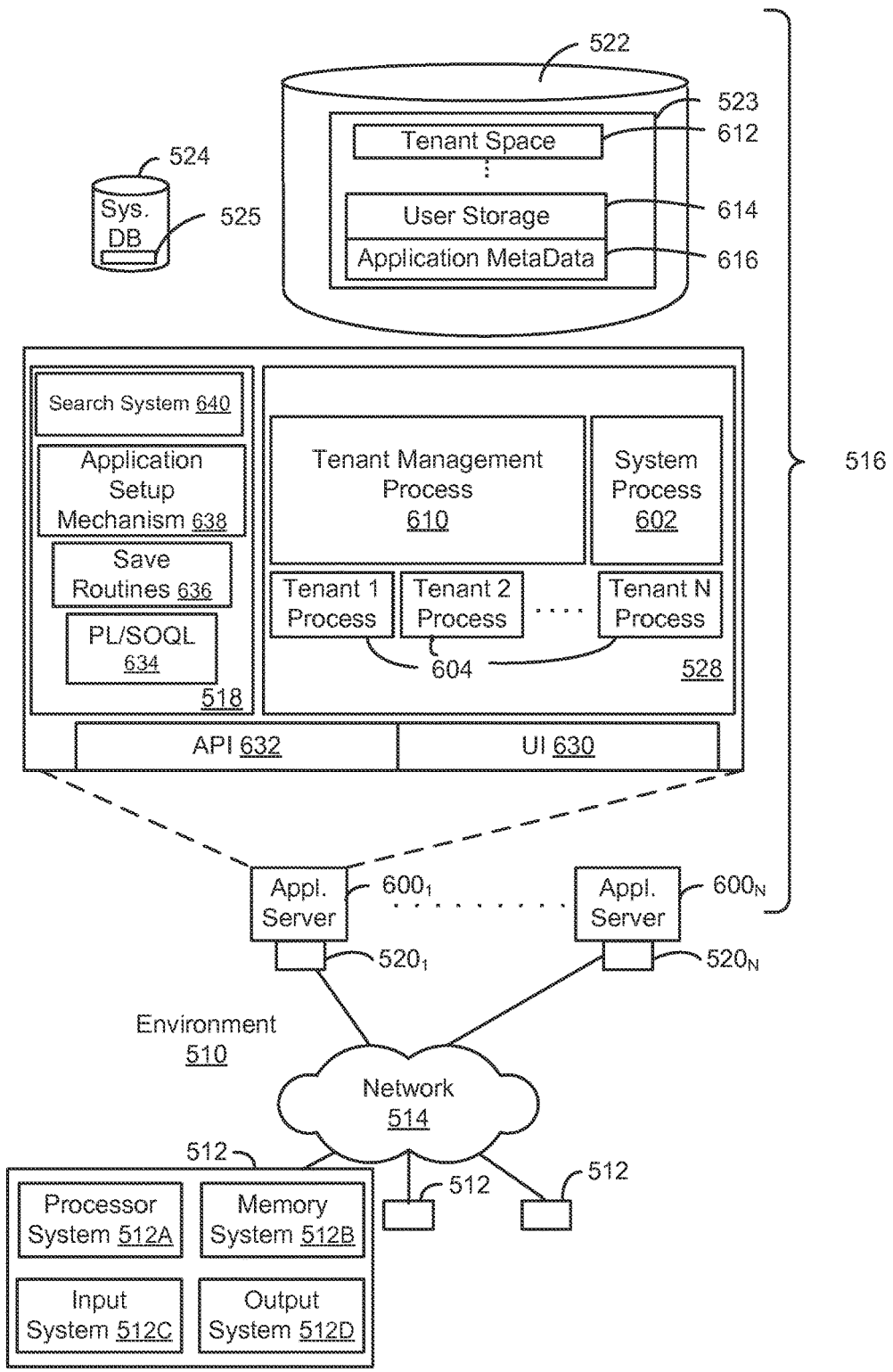
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, hereby incorporated in its entirety herein for all purposes. Invocations to applications may be detected by one or more system processes, which manages retrieving application metadata 516 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITLES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the an. Therefore, the scope of the appended claims should be accorded the broadest interpretation so as to encompass all such modifications and similar arrangements.

The invention claimed is:

1. A non-transitory computer-readable medium having computer instructions stored thereon that are capable of being executed by a computer system to cause operations comprising:
   storing a plurality of content delivery objects, each content delivery object including at least a respective identification of corresponding content and a location of the corresponding content, wherein the content delivery object allows one or more users to access the corresponding content;
   storing respective metadata for at least one of the plurality of content delivery objects;
   receiving a call, via an application external to the computer system, to an application programming interface (API) for access to a subset of the content delivery objects, wherein the call includes one or more parameters associated with the subset;
   performing a query of the respective metadata using the parameters included in the call by searching for the subset of the content delivery objects that meet the parameters included in the call;
   generating a report that includes a viewable list of the subset of the content delivery objects that include metadata that corresponds to the parameters included in the call; and
   sending the report to the external application.

2. The computer-readable medium of claim 1, wherein storing the plurality of content delivery objects comprises storing an indicator of a location at which the corresponding content is stored.

3. The computer-readable medium of claim 2, wherein the indicator is a link, that corresponds to a uniform resource locator (URL).

4. The computer-readable medium of claim 1, further comprising optimizing the query according to one or more preconfigured policies.

5. The computer-readable medium of claim 1, wherein the one or more parameters include presentation criteria to be used for displaying the subset of the content delivery objects in the viewable list.

6. The computer-readable medium of claim 5, further comprising enforcing, by the API, one or more security policies that prevent at least one content delivery object with metadata that corresponds to the parameters from being included in the viewable list.

7. The computer-readable medium of claim 6, wherein a particular security policy, corresponding to a particular content delivery object, requires a correct password in order for the particular content delivery object to be included in the viewable list.

8. A method, comprising:
   storing, by a database system, a plurality of content delivery objects, each content delivery object including at least a respective identification of corresponding content and a location of the corresponding content, wherein the content delivery object allows one or more users to access the corresponding content;

storing, by the database system, respective metadata for at least one of the plurality of content delivery objects;

receiving, by the database system from an application external to the database system, a call to an application programming interface (API) for access to a subset of the content delivery objects, wherein the call includes one or more parameters associated with the subset;

performing, by the database system, a query of the respective metadata using the parameters included in the call by searching for the subset of the content delivery objects that satisfy filtering criteria included in at least one of the parameters included in the call;

generating, by the database system, a report that includes a viewable list of the subset of the content delivery objects that include metadata that corresponds to the parameters included in the call; and sending the report to the external application.

9. The method of claim 8, wherein storing the plurality of content delivery objects comprises storing an indicator of a location at which the corresponding content is stored.

10. The method of claim 9, wherein the indicator is a link, that corresponds to a uniform resource locator (URL).

11. The method of claim 9, wherein storing the indicator comprises storing a link to a document into at least one content delivery object.

12. The method of claim 8, wherein the one or more parameters include presentation criteria to be used for displaying the subset of the content delivery objects in the a viewable list.

13. The method of claim 12, further comprising enforcing, by the API, one or more security policies that prevent at least one content delivery object with metadata that corresponds to the parameters from being included in the viewable list.

14. The method of claim 13, wherein a particular security policy, corresponding to a particular content delivery object, requires a correct password in order for the particular content delivery object to be included in the viewable list.

15. A method, comprising:

storing, by a database system, a plurality of content delivery objects, each content delivery object including at least a respective identification of corresponding content and a location of the corresponding content, wherein the content delivery object allows one or more users to access the corresponding content;

storing, by the database system, a value for respective fields for one or more of the plurality of content delivery objects;

receiving, by the database system from a first application external to the database system, a call to an application programming interface (API) for access to a subset of the content delivery objects, wherein the call includes one or more parameters associated with the subset;

performing, by the database system, a query of the respective fields using the parameters included in the call, at least one of the parameters including filtering criteria for selecting the subset of the content delivery objects; and generating, by the database system, a report that includes a viewable list of the subset of the content delivery objects that include values for the respective fields that corresponds to the parameters included in the call.

16. The method of claim 15, wherein storing the plurality of content delivery objects comprises storing an indicator of a location at which the corresponding content is stored.

17. The method of claim 16, wherein the indicator is a link that corresponds to a uniform resource locator (URL).

18. The method of claim 16, wherein storing the indicator comprises storing a link to a web page into at least one content delivery object.

19. The method of claim 15, wherein the one or more parameters include presentation criteria to be used for displaying the subset of the content delivery objects in the a viewable list.

20. The method of claim 19, further comprising enforcing, by the API, one or more security policies that prevent at least one content delivery object with values for the respective fields that corresponds to the parameters from being included in the viewable list.

* * * * *